Dec. 29, 1964 M. R. GRIFFEL 3,163,395
ELASTIC FLUID TURBINE
Filed April 1, 1963 5 Sheets-Sheet 1

FIG.1

INVENTOR.
MARC R. GRIFFEL
BY
*B. P. Fishburne, Jr.*
ATTORNEY

United States Patent Office 3,163,395
Patented Dec. 29, 1964

3,163,395
ELASTIC FLUID TURBINE
Marc R. Griffel, Burlington, Iowa, assignor to Murray Iron Works Company, Burlington, Iowa, a corporation of Iowa
Filed Apr. 1, 1963, Ser. No. 269,268
16 Claims. (Cl. 253—39.1)

This invention relates to an elastic fluid turbine.

More specifically, the invention relates to that type of steam turbine which is known in the industry as a "mechanical drive," utilized to operate a variety of driven machines, such as pumps, fans and compressors and other similar equipment which generally does not exceed 500 H.P. and can be driven either directly or by means of reduction gearing economically with turbine speeds in the range of 1750–5000 r.p.m. Most frequently, the turbine serves a horsepower range of about 10–250 and the turbine is intended to operate with steam pressures of about 100–600 p.s.i.g. and exhaust non-condensing to back pressures from 0 to about 100 p.s.i.g. Total steam temperature ranges from saturated to about 750° F.

The present invention is concerned primarily with improvements of construction for manufacturing as distinguished from operating principles, or overall efficiency of operation and among the objects of the invention is to provide a turbine whose construction renders the assembling, disassembling and maintenance of the turbine more simplified and economical than has heretofore been possible with broadly similar devices of the prior art.

Another important object is to provide an improved simplified mechanical governor mechanism and control linkage for the turbine which has minimum friction losses and which is enclosed and lubricated and rugged and durable in construction and reliable in operation.

A further object of the invention is to provide a steam turbine having a nozzle chest mounted entirely within and surrounded by the exhaust casing and subjected internally to the pressure of steam exiting through the several nozzles and externally to exhaust steam pressure.

Another important object is to provide a novel, simplified and economical means of connecting the nozzle chest with the valve chest and turbine casing, in a manner permitting ready reversal of turbine wheel rotation without the necessity for changing nozzles or blading and by the mere reassembling of the valve chest, nozzle chest and turbine wheel upon the casing, the latter having an exhaust casing portion with a pair of duplicate flanges to facilitate the reverse operation assemblage.

Another object is to provide in a turbine of the mentioned character a relatively small prefabricated nozzle block which is subsequently assembled to the nozzle chest within an opening thereof by welding.

Still another object is to provide coaxially mounted governor and trip valve elements within the valve chest having telescoping valve stems which are brought out of the valve chest at the same end, one stem connected with the governor and the other stem with the overspeed governor, thereby simplifying the control linkage and rendering the overall construction highly compact and easy to assemble and maintain.

Another object is to provide a valve chest in which the trip and governor valves are both single seated, yet statically balanced.

Another object is to provide in a turbine of the mentioned character novel means for cooling the main sleeve bearings of the turbine shaft.

Other objects and advantages of the invention will be apparent during the course of the following detailed description.

In the accompanying drawings forming a part of this application and in which like numerals are employed to designate like parts throughout the same.

In the drawings, wherein for the purpose of illustration are shown preferred embodiments of the invention, the numeral 15 designates a main casing in its entirety, which casing is divided horizontally at the rotational axis of the turbine wheel and includes an upper cover section 16 and a lower base and exhaust section 17 shaped to accommodate the nozzle chest and associated elements to be described. The casing sections 16 and 17 are flanged and securely detachably connected in a fluid tight manner by bolts 18, FIGURE 2.

Figure 1:
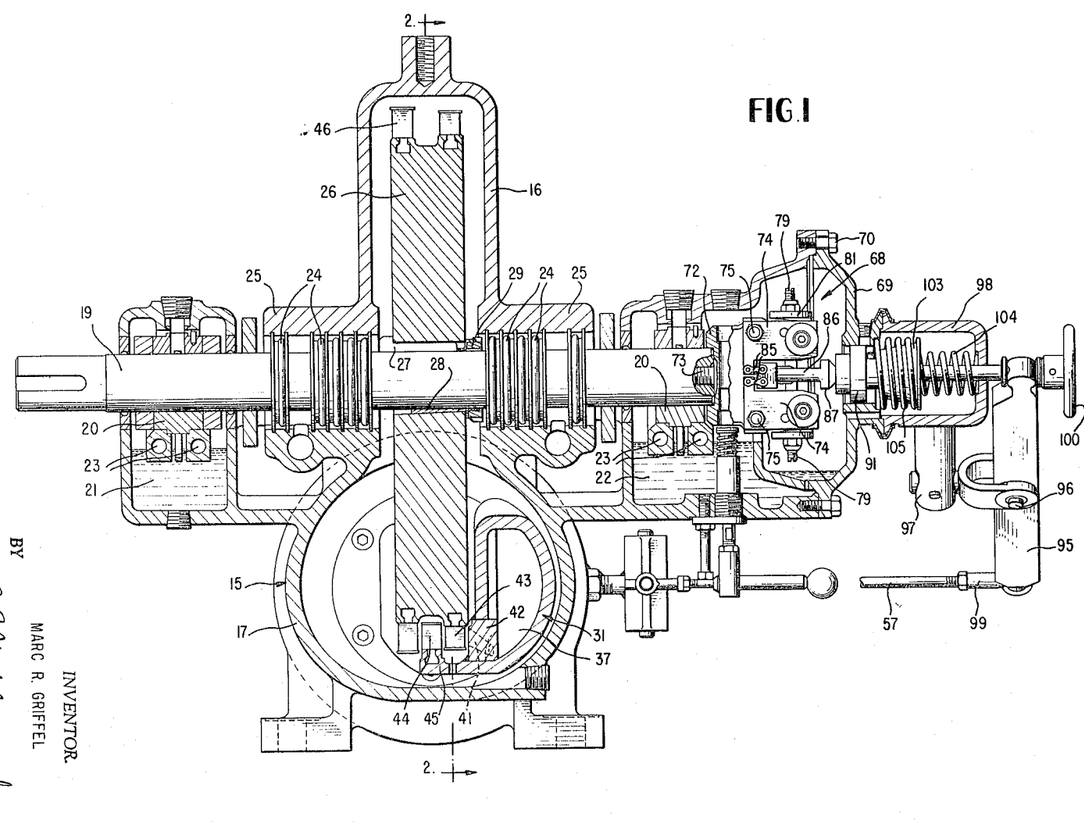
FIGURE 1 is a central vertical longitudinal section through a single-stage two row impulse type turbine and governor mechanism embodying the invention.

A main turbine shaft 19, FIGURE 1, extends axially through the casing 15 and is journaled near its opposite ends for rotation within sleeve bearings 20, mounted within lubricating reservoirs 21 and 22 formed as integral extensions on the casing 15. The bearings 20 are efficiently water cooled by the passage of water through holes 23 formed directly within the bearing seats and heat is conducted away from the bearings 20 by this water cooling and by the oil in the reservoirs 21 and 22. The cooling pasages 23 may be readily cleaned when required to insure continued efficient cooling of the bearings.

Conventional carbon ring glands 24 are employed surrounding the shaft 19 and within casing extensions 25 to permit back pressures greater than atmospheric within the turbine casing.

A two-row impulse turbine wheel 26 is provided within the casing 15, FIGURE 1, and keyed to the shaft 19 for rotation therewith between the sets of glands 24 by means of a shouldered key 27 and a tapered sleeve 28 with a lock nut means 29 as indicated. The exposed end of shaft 19 at the left hand end of FIGURE 1 is adapted for driving connection directly with a driven machine or with reduction gearing not shown herein.

Figures 2, 10:
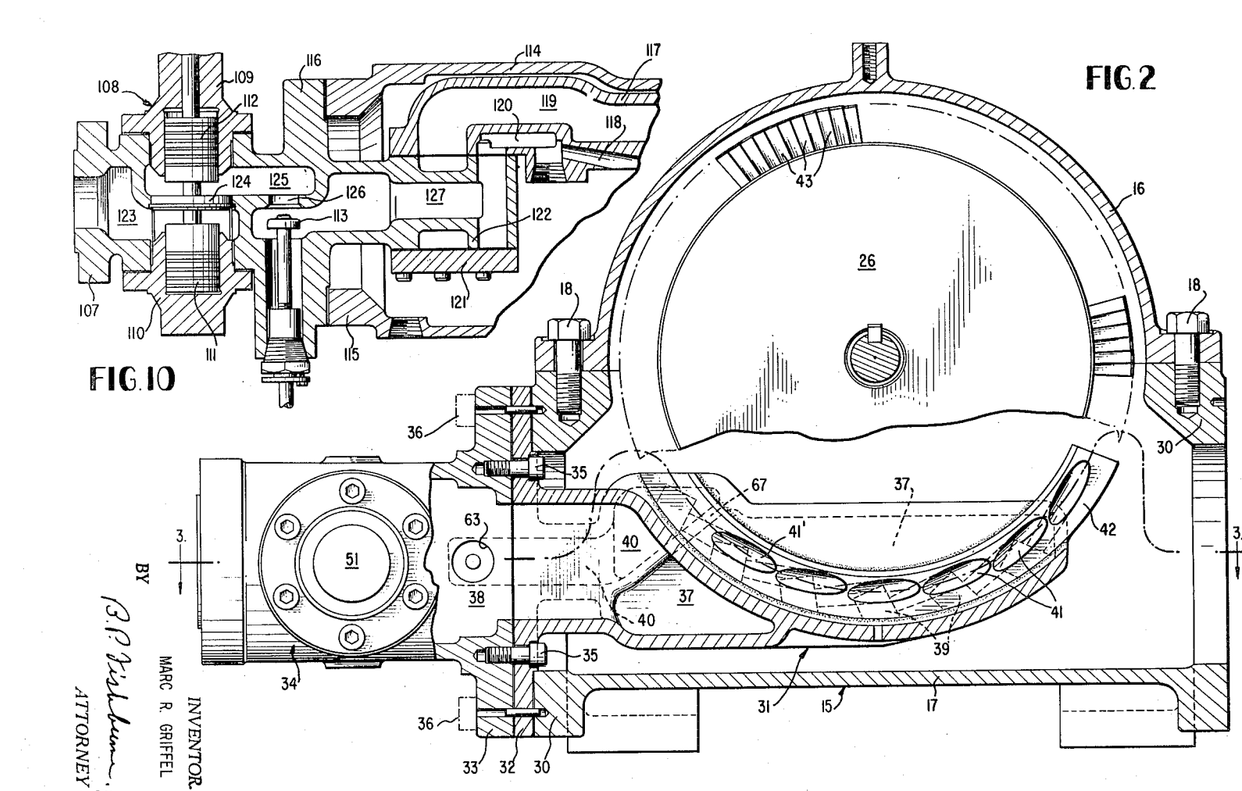
FIGURE 2 is a transverse vertical section, partly in elevation, taken on line 2—2 of FIGURE 1.
FIGURE 10 is a fragmentary vertical section similar to FIGURES 3 and 4 and showing a modified construction for connecting the valve chest, nozzle chest and casing.
Figures 3, 4:
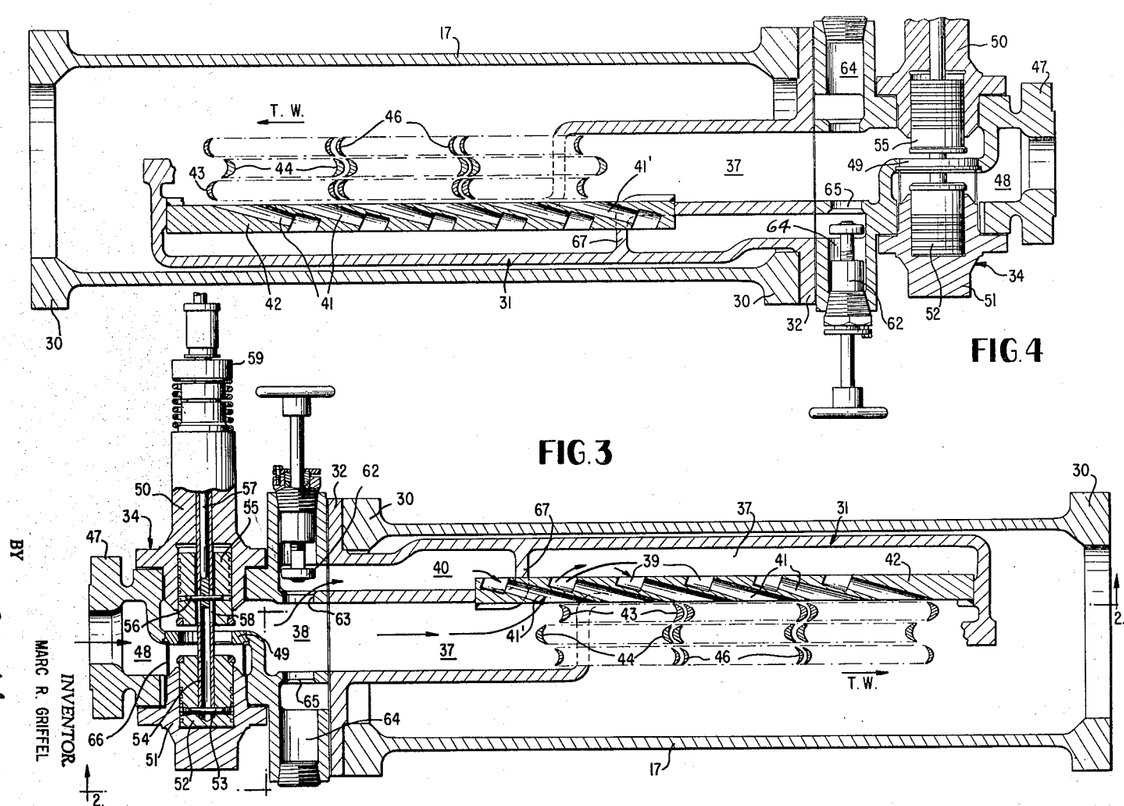
FIGURE 3 is a horizontal section taken on line 3—3 of FIGURE 2.
FIGURE 4 is a view similar to FIGURE 3 and showing the reverse assembly of the nozzle chest, wheel and valve chest with the double flanged exhaust chamber to permit reversed turbine rotation without a change in the design of nozzles and turbine blading.

Lower casing section 17, which is essentially tubular, FIGURES 2–4, is provided at its opposite ends on opposite sides of the wheel 26 with identical flanges 30 which constitute an important feature of the invention in that they allow for mounting the valve and nozzle chests in a novel manner on either end of the casing 17 to effect either right hand or left hand rotation of the turbine while using the same blading and nozzles, thereby requiring the manufacturing and stocking of fewer parts for initial installation or subsequent use by the manufacturer or customer. Steam from the nozzle chest may be admitted at either end of the casing 17, FIGURES 3 and 4, and exhausted through either of the flanges 30 depending upon the chosen method of assembly, and no additional flanging of the casing section 17 is required to effect the assembly of elements.

Figure 5:
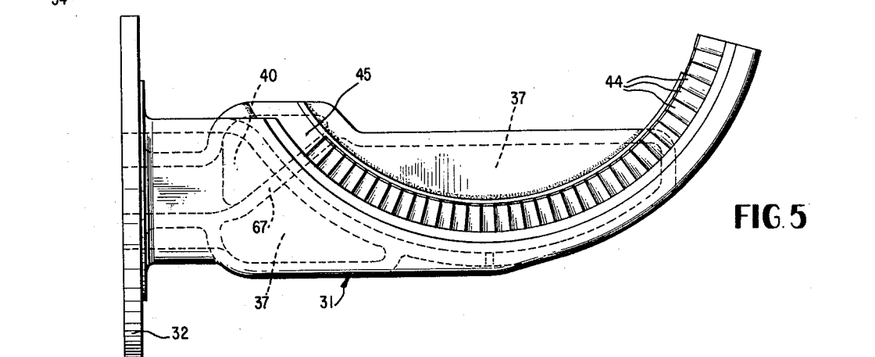
FIGURE 5 is a side elevational view of the nozzle chest and stationary blading carried thereby.

A nozzle chest 31 shown in its entirety in FIGURE 5 carries at one end a flange 32 which is placed against the outer face of the selected casing flange 30 and sandwiched between this flange and a mating flange 33 of a valve chest 34 to be described in detail. The three stacked flanges are rigidly detachably connected by sets of bolts 35 and 36 which are oppositely facing, FIGURE 2. Consequently, the entire nozzle chest 31 is removably mounted within the exhaust casing section 17 where it is subjected externally to exhaust steam pressure and internally to inlet steam pressure, this arrangement constituting a safety feature of the invention.

The nozzle chest 31 contains a main interior chamber 37 leading from the main outlet chamber 38 of the nozzle chest for supplying steam to the inlets 39 of the several nozzles in the annular group adjacent the bottom portion of the turbine wheel except for the first nozzle which is supplied steam from an auxiliary chamber 40 also formed within the nozzle chest 31 by casting. The precise number of nozzles may be varied from machine-to-machine depending upon the particular requirements.

The nozzles 41 are pre-machined in the preferred form of the invention in a separately formed relatively small arcuate nozzle block 42 which is subsequently welded within an opening in the nozzle chest 31 to produce a unitary assembly. The nozzles 41 including the first nozzle 41′ under the additional control of a hand valve to be described are drilled essentially tangentially, although the axis of each nozzle makes an angle with the transverse plane of the turbine as shown. Each nozzle is also angled toward the center or from the true tangent when viewed as shown in FIGURE 2.

Referring to FIGURE 3 which shows the several nozzles 41 and 41′ and the stationary and movable blading, the steam under pressure is directed first against the first moving blade row 43 on the wheel 26, and is then reversed by the fixed row of blades 44, mounted upon an integral segmental extension 45 of the nozzle chest 31. The steam is then redirected against the second moving row of blades 46 on the wheel and finally enters the exhaust casing section 17 and exhausts through the open flange 30 at one end thereof, FIGURE 2.

Figure 6:
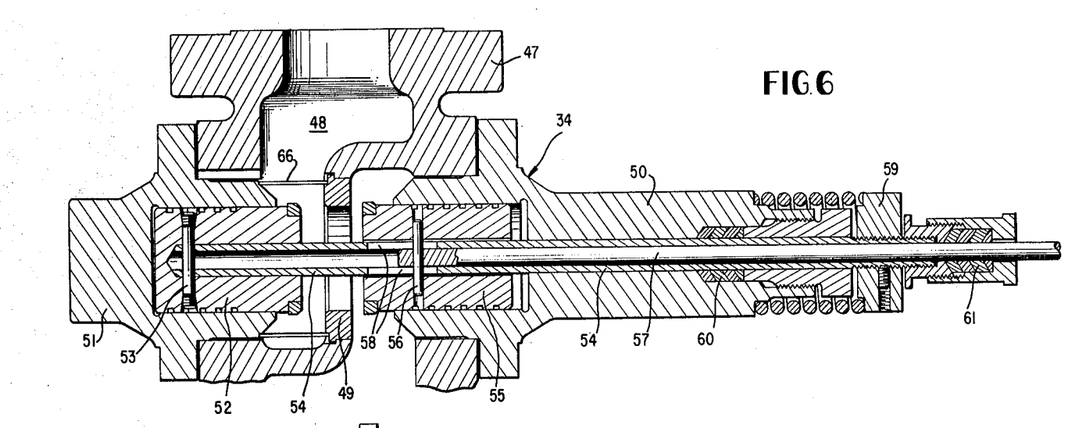
FIGURE 6 is an enlarged vertical section through the valve chest, valve chest covers and associated elements.

The valve chest 34, previously mentioned, has a steam inlet flange 47 containing a steam inlet passage 48 communicating with the bore of a valve seat 49, upon opposite sides of which are mounted separable valve chest covers 50 and 51. A trip valve element 52 is disposed within a bore of the cover 51 and crosspinned at 53 to a tubular stem 54 extending axially thereof and transversely of the axis of flange 47. A governor valve element 55 coaxial with the valve 52 is mounted in a similar bore of the cover 50 and is crosspinned at 56 to a solid stem 57 arranged telescopically inside of the tubular stem 54, which tubular stem is slotted at 58 to permit relative axial movement of the two valve elements and their stems. As best shown in FIGURE 6, the concentric stems 54 and 57 are both brought out through the same end of cover 50 and the stem 57 is directly connected with the governor lever to be described whereas the stem 54 through its spring loaded collar 59 and associated elements, FIGURE 6, is connected with an overspeed governor, not shown. Suitable packings 60 and 61, FIGURE 6, are provided on the cover 50 for the respective stems 54 and 57.

The valve chest also has mounted thereon adjacent the flange 33 a hand nozzle control valve 62 cooperating with a seat 63 between the chambers 38 and 40 and the axis of the valve 62 is parallel to the axes of the governor and trip valve elements and spaced therefrom. Axially opposite the hand valve 62, FIGURE 3, a plugged opening 64 and another seat 65 are provided in the valve chest to accommodate the hand valve 62 in a second position, FIGURE 4, when the parts are assembled for reverse operation of the wheel.

It may now be seen that steam enters the valve chest from a suitable steam generator through the inlet flange 47 and passage 48 and then flows through a removable steam strainer 66 which may be removed after first removing the cover 51. The steam then passes through the seat 49 common to the valves 52 and 55 and enters the chamber 38. Most of the pressurized steam then flows directly into the main passage 37 of nozzle chest 31 and directly to the inlets 39 of the several nozzles 41, through which the steam passes to have its pressure reduced and its velocity greatly increased to impinge upon the blading. However, a portion of the steam, depending upon the adjustment of the hand valve 62 is divided and flows through the seat 63 to the passage 40 and then to the first nozzle 41′ which is under direct control of the hand valve. A wall 67 in the nozzle chest 31 divides or separates the chambers 37 and 40 as shown. After the steam exits from the blading, it exhausts through the open end of casing section 17.

With particular references to FIGURES 1 and 4, it may be seen that the turbine wheel 26 can be reversed end-for-end on the shaft 19, by also reversing key 27, nut 29 and tapered sleeve 28. When this is done, the wheel will have the same position on the shaft as formerly except that the blade row 46 will be next to the nozzle block 42 or on the right hand side in FIGURE 1. This reversal will face the moving blades in the opposite direction. Since the casing flanges 30 are identical and symmetrical with respect to the center line, and since valve chest 34 is symmetrical about a horizontal transverse center line, the parts may be reassembled as shown in FIGURE 4 to cause the turbine to operate in the reverse direction from that shown in FIGURES 2 and 3. That is to say, by means of the selective assembling of the identical parts in the manners shown in FIGURES 3 and 4 and without actually changing the construction of any of the parts, the turbine may achieve right hand steam inlet with right hand rotation or left hand inlet with left hand rotation, as should now be obvious. When the valve chest 34 is assembled to the opposite end of casing section 17, FIGURE 4, the covers 50 and 51 are also turned end-for-end as compared to FIGURE 3 and the hand valve 62 is then placed on the same side as the trip valve 52 and occupies the opening 64 and the auxiliary seat 65 is utilized instead of the seat 63. The opening previously receiving the hand valve 62 in FIGURE 3 is now plugged as shown in FIGURE 4. The mode of operation of the reverse parts is identical to that previously described.

Figures 7, 8, 9:
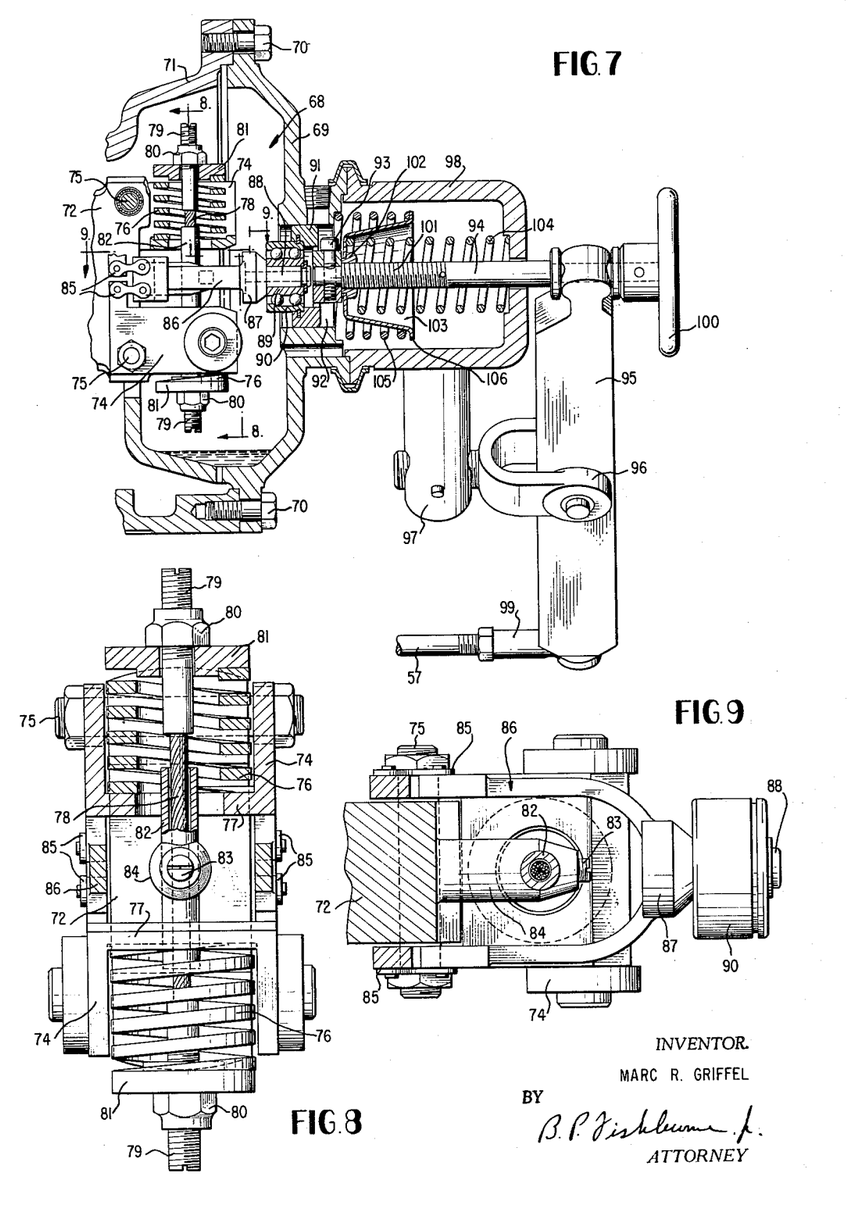
FIGURE 7 is an enlarged fragmentary vertical section through the governor mechanism and associated elements.
FIGURE 8 is a transverse vertical section taken on line 8—8 of FIGURE 7.
FIGURE 9 is a fragmentary enlarged horizontal section taken on line 9—9 of FIGURE 7.

As shown in FIGURES 1 and 7–9, an improved shaft governor 68 is provided, having a flanged casing 69 bolted at 70 to a flange extension 71 outboard of the adjacent sleeve bearing 20. The governor mechanism is thus fully enclosed and protected as shown in FIGURES 1 and 7.

The governor is a flyball type mechanical governor which operates at turbine shaft speed. It comprises a head 72 rigidly secured as at 73 to the adjacent end of the shaft 19. A pair of opposed U-shaped governor weights 74 of identical construction and mass are pivotally mounted on frictionless pivots 75 to the governor head 72. The effect of centrifugal force on the governor weights tending to move them outwardly is resisted by a pair of coaxial coil springs 76 whose inner ends bear directly against the inner side walls 77 of the weights as best shown in FIGURE 8. These springs are precompressed by a steel cable 78 which passes through the center of both springs, having at its ends screw-threaded fittings 79 carrying nuts 80 and washers 81 for seating the outer ends of the springs. It will be seen that compression of both springs can be accomplished by adjusting the nuts 80, and for maintaining balance, the nuts are tightened equally during assembly as determined by measurement. The cable 78 passes loosely through a guide sleeve 82, which is securely mounted by a set screw 83 to an extension 84 of governor head 72.

Each weight 74 is connected by a pair of drag links 85 to a governor spindle 86 having a head 87 and a spindle extension 88, all integrally formed for rotation in unison with the head 72 and turbine shaft. As shown in FIGURE 9, the spindle 86 is bifurcated or yoke-like and its sides are connected with the links 85, and movement of the governor weights 74 while rotating produces axial movement of the head 87 and spindle extension 88. Spindle extension 88 engages within the inner race 89 of a ball bearing whose outer race 90 is secured within a bearing holder 91 which is non-rotatable but axially movable within a bore 92 of the governor housing. The bearing holder 91 is secured by a cross screw 93 to a speed changer spindle 94, which spindle also transmits axial motion responsive to movement of the governor weights to a governor lever 95, pivoted near its mid point at 96 to a fixed arm 97, rigid with casing extension 98. The other end of lever 95 is connected with movable governor valve stem 57, previously described, through a suitable screw-threaded fitting 99.

A hand wheel 100 is provided on spindle 94 for turning the latter and this spindle is screw-threaded at 101 to receive adjustably a screw-threaded nut part 102 of a cup 103, interposed between a pair of coil springs 104 and 105, FIGURE 7. Thus, turning of hand wheel 100 shifts cup 103 axially, thus compressing one of the two springs connected with it while relaxing the other and vice-versa, as shown in FIGURE 7. The spring 104 has one end seated within the cup 103 and its other end engaging the end wall of casing extension 98. The other spring 105 has its outer end engaging a cup flange 106 while its inner end is seated upon a wall of the casing 69. This arrangement produces either an inward or an outward force through the ball bearing on spindle head 87 and associated parts. The effect of this force change is to change the total force resisting the governor weights, thus changing the governed speed while the turbine is running. The application of the speed changer force directly to the spindle makes its effect constant irrespective of the governor lever ratio or governor valve travel, and does not load up the governor lever pivot or valve stem connection, thus eliminating friction. Since the force is applied in both directions, the load on the spindle bearing and main thrust collar is approximately one-half of what it would otherwise be if the load were all taken in one direction for the same degree of speed change.

In FIGURE 10 of the drawings, there is shown a slight modification of the construction, particularly effecting the connection between the exhaust casing, nozzle chest and valve chest. In this figure, the numeral 107 designates the steam inlet flange of valve chest 108 having covers 109 and 110 receiving trip and governor valves 111 and 112 and their coaxial stems, as previously described. A manual valve 113 corresponding to manual valve 62 is also provided upon the valve chest 108, as indicated. The exhaust casing section 114 has one of its two identical flanges 115 secured directly to a flange 116 formed on the valve chest and the intermediate flange 32 of the previously-described nozzle chest 31 is eliminated entirely.

A modified form of prefabricated nozzle chest 117 is provided having pre-machined nozzles formed therein, the first nozzle 118 of which only is shown in FIGURE 10. Nozzle chest 117 has a main internal chamber 119 communicating with the other nozzles of the group not shown and a secondary chamber 120 separated from the chamber 119 and leading to the first nozzle 118 under control of the hand valve 113. A cover plate 121 is utilized to cover the entrance passage of valve chest extension 122 which is inactive when the nozzle chest 117 is on the side shown in FIGURE 10.

In operation, steam enters the chamber 123 of inlet flange 107 and flows through the bore of dual valve seat 124 between the governor and trip valves and enters passage 125 of valve chest, from which the steam directly enters nozzle chest chamber 119 leading to all nozzles except the nozzle 118. A portion of the steam flows through valve seat bore 126 and into secondary valve chest chamber 127 from which the steam flows into secondary chamber 120 leading to the first nozzle 118 under control of the hand valve 113. The mode of operation is otherwise the same as previously described for the first and preferred form of the invention.

By means of the construction shown, it is possible to achieve right hand steam inlet and right hand turbine rotation, right hand inlet and left hand rotation, left hand inlet and right hand rotation and left hand inlet and left hand rotation. Consequently, in this one respect, the invention shown in FIGURE 10 is a bit more flexible than the prior preferred form. The outlet flange 116 of the valve chest 108 conforms to the exhaust flanges 115 on the opposite ends of casing 114. The extension 122 of the valve chest is double flanged so that it will mate with the inlet of the nozzle chest in one of two positions as shown. The valve chest is symmetrical vertically as far as connections are concerned so that when installed on the opposite side of the turbine, it may be reversed vertically and the nozzle chest 117 may be applied to the opposite side of extension 122, in which case the cover plate 121 is used on the opposite side of this extension. All other parts and their operation may be substantially identical to the corresponding parts previously described in connection with the first form or embodiment.

In the first-described embodiment, FIGURES 1 through 9, the entire nozzle chest 31 can be withdrawn longitudinally through either of the end openings in the flanges 30. In the FIGURE 10 embodiment, the nozzle chest 117 is inserted in casing section 114 through the opening at the horizontal joint from above.

In connection with the valve chest in both forms of the invention, it is to be noted that both the trip and governor valves are single seated. Although these valves are in static balance, they are much easier to maintain, remove and reseat than conventional double seated valves. Moreover, the leakage is reduced, in fact, the trip valve can be maintained as tight as a globe valve. The seat is much more easily removed than a complex double seated cage, since a single seat serves both valves. By having the governor valve stem within the trip valve stem and bringing both stems out of the valve chest on one side simplifies the linkage greatly over what would otherwise be required.

The improved governor employs dual transverse springs, as described. These springs are self-equalizing, being compressed with a single cable and are easily adjusted for proper spring load with an ordinary wrench. The centrifugal force of the weights is resisted by the springs in the plane in which it occurs. There is no heavy force on the weight pivots, sleeve or other parts to cause friction. Governor springs, weights and auxiliary weights are easily removed. If desired, the governor with the overspeed governor can be removed as a unit by unscrewing from the turbine shaft.

The speed changer is arranged to add or subtract from the total governor spring load. This reduces end thrust to one-half of that which would otherwise be required if the spring load were all in one direction. This arrangement promotes the life of the governor spindle bearing as well as the main thrust bearing. Since the speed changer spring load is coaxial with the governor spindle, the characteristics of the governor are unchanged when the governor lever ratio or valve travel are changed. The springs and entire governor are enclosed and protected from weather and are lubricated by an oil bath.

Because of the selective left hand or right hand steam inlet, exhaust and rotational assembly feature, fewer parts need be on hand for manufacturing turbines on various turbine orders. It is therefore practical to stock manufactured parts to a greater degree which permits quicker delivery since the parts can be carried in a greater degree of assembly. After a turbine has been in use, it can be changed quickly with respect to rotation by the customer. Also, customers who stock spare parts need carry only one-half the inventory of spares of the major parts.

As described, the valve chest mounts on an opening in the casing, which is a duplicate of the exhaust opening. Usually, these openings must be provided on both sides to permit choice of exhaust openings. In the present case, the opening which is not used for connection to the exhaust pipe mounts the valve chest and nozzle chest and eliminates a need for a special flanged opening usually in the front of the turbine for mounting these parts. This not only saves manufacturing costs but adds to the strength of the casing, thus permitting higher back pressures or lower stress.

By welding the nozzle block in the nozzle chest, the bulky bolting flange commonly used is eliminated. Thus, the amount of material needed for the nozzle block is reduced over a bolted construction which saves in cost because expensive corrosion-resistant materials are employed. The nozzle chest is cast with a large opening later covered by the nozzle block welded therein. This opening permits thorough cleaning of the casting, reducing chances for later damage to the blades by foreign particles which might not be removed by closed casting construction. Since no bolting is used, it is possible to cast the segment support with the nozzle chest to effect a saving in cost.

It is to be understood that the forms of the invention herewith shown and described are to be taken as preferred examples of the same, and that various changes in the shape, size and arrangement of parts may be resorted to, without departing from the spirit of the invention or scope of the subjoined claims.

Having thus described my invention, I claim:

1. A turbine comprising a casing including an exhaust casing section defining a chamber and having opposite substantially identical end flanges and end openings, a turbine wheel disposed within the casing and having blades and projecting into said chamber, a shaft carrying said wheel and journaled upon the casing, shaft speed governor means carried by the casing and connected with said shaft and including linkage means exteriorly of the casing, a nozzle chest and nozzle block unit extending removably and bodily through one of said identical end openings and into said chamber near one side of said wheel so that the nozzles thereof may direct steam against the blades of the wheel for turning the latter, said unit having internal steam passage means opening through one end thereof, an exterior flange on said unit abutting the exterior face of one of said identical end flanges, a valve chest including a flange abutting said unit flange so that the latter is sandwiched between the valve chest flange and said one identical flange of the casing, bolt means detachably rigidly connecting all of said flanges in assembly, said valve chest having steam passage means and a valve seat, said last-named passage means communicating with said internal steam passage means, coaxial governor and trip valve elements within said valve chest on opposite sides of said seat, said seat common to said coaxial valve elements, telescopically interfitting stems one each secured to said governor and trip valve elements, said stems emerging from one side of said valve chest, and said stem of the governor valve element connected with said exterior linkage means.

2. A turbine comprising a casing including a transverse generally tubular portion having symmetrical substantially identical end mounting flanges and end openings either of which openings may serve selectively as an exhaust opening and either of which flanges may serve selectively to mount a nozzle chest and valve chest, whereby the direction of rotation of the turbine may be readily reversed without the necessity for a change in the design of nozzles or blading, a bladed turbine wheel within said casing and projecting into said tubular portion, a shaft journaled for rotation upon the casing and keyed to said wheel, speed governor means connected with said casing and shaft and including an exterior movable linkage, a nozzle chest extending bodily and removably within and through a selected one of said openings and within said tubular casing portion upon one side of said wheel for directing steam toward the blades of the wheel, a flange on the nozzle chest exteriorly of the casing and engaging the outer face of a selected one of said flanges of the casing, a valve chest, a flange on one end of the valve chest engaging the exterior face of the nozzle chest flange, bolt means interconnecting the nozzle chest flange, valve chest flange and said selected casing flange in sandwiched relation, coaxial spaced governor and trip valve elements within the valve chest having their common axis substantially at right angles to the common axis of said sandwiched flanges and said nozzle chest, a valve seat within the valve chest between said valve elements and common thereto, and coaxial telescopically interfitting valve stems for the governor and trip valve elements and connected one each thereto and emerging through one side of the valve chest, the stem of the governor valve element connected with said movable linkage.

3. The invention as defined by claim 2, and wherein one of said interfitting stems is slotted, and crosspins interconnecting said valve elements and stems, one of said crosspins extending through the slots of the slotted stem to allow relative axial movement of the valve elements and stems.

4. In a steam turbine of the single stage impulse type, a generally tubular exhaust casing portion having symmetrical substantially identical end flanges and openings either one of which openings may be employed selectively as an exhaust opening and either one of which flanges may serve selectively for the mounting of a nozzle chest and valve chest thereon, a nozzle chest within said casing portion and having main and auxiliary separated steam passages and an opening, a prefabricated nozzle block welded within said opening of the nozzle chest with the inlet of at least one nozzle communicating with said auxiliary passage and the inlets of the other nozzles communicating with said main passage, a flange on said nozzle chest engaging the exterior face of a selected end flange of the casing portion, a valve chest having a flange engaging the exterior face of the nozzle chest flange, bolt means interconnecting said selected end flange, nozzle chest flange and valve chest flange in sandwiched relation detachably, said valve chest having a steam inlet flange, an interior steam passage and a valve seat within the interior steam passage, governor and trip valve elements within the valve chest on opposite sides of said seat, said seat common to said governor and trip valve elements, said valve chest having another seat intermediate said main and auxiliary steam passages of the nozzle chest, and a hand valve on the valve chest movable toward and away from the last-named seat for regulating the passage of steam into the auxiliary steam passage.

5. In a steam turbine, as a sub-combination, a generally tubular exhaust casing portion having symmetrical substantially identical end flanges and openings either one of which openings may serve selectively as an exhaust opening and either one of which flanges may serve selectively for the mounting of a valve chest and nozzle chest thereon, a valve chest including a mounting flange engageable with the exterior face of a selected one of said identical end flanges, said valve chest having a steam inlet flange on its end remote from said mounting flange, an interior steam passage, and a valve seat within the interior steam passage, governor and trip valve elements within the valve chest coaxially arranged on opposite sides of said seat, an extension on the valve chest projecting into said tubular exhaust casing portion and having a chamber communicating with the interior passage of the valve chest, said extension symmetrically flanged on opposite sides thereof within said casing portion, a nozzle chest disposed bodily and removably within said casing portion and having an inlet flange engageable with a selected flange of said valve chest extension, and a cover plate for the opposite flange of said extension adapted to be reversed with the nozzle chest when the other end flange of the tubular casing portion is employed for the mounting of the valve chest to effect turbine reversal without the necessity for changing nozzles or turbine blading.

6. A turbine comprising a casing having a generally tubular portion, said portion having symmetrical substantially identical end flanges and end openings either of which openings may serve selectively as an exhaust opening and either of which flanges may serve selectively for the mounting thereto of a valve chest and nozzle chest, whereby turbine rotation may be reversed with changing blading or nozzle design, a nozzle chest and valve chest unit for said turbine projecting interiorly and exteriorly of the tubular casing portion and having exterior flange means secured to the exterior face of a selected one of said end flanges, said unit detachable from said casing portion and mountable on the other end flange thereof to effect said reversal of turbine rotation by the use of the same parts, a turbine wheel within said casing projecting into said tubular portion near the nozzles of the nozzle chest, a shaft journaled upon the casing for rotation and carrying said turbine wheel, a speed governor on said casing for said shaft and secured thereto, and control linkage means external to the casing interconnecting said governor and valve chest unit.

7. The invention as defined by claim 6, and bearings for said turbine shaft on said casing near the ends of the turbine shaft and seats for said bearings having passages through which a liquid coolant may flow to cool the bearings.

8. The invention as defined by claim 2, and wherein said bladed turbine wheel has two spaced rows of blades on its periphery to turn therewith, a lateral extension on said nozzle chest, and a row of stationary blades on said extension engaging between the rows of blades on said wheel around a substantial portion of the periphery of said wheel.

9. A nozzle chest and nozzle block prefabricated unit for selective mounting on either end of a symmetrical double flanged turbine casing either end of which may serve as an open exhaust and either end of which may serve to mount said unit, whereby turbine rotation may be reversed by selective assembly without modifying the structure of parts, said unit comprising an elongated somewhat arcuate body portion having internal divided main and auxiliary steam passages opening through one end of the body portion and an opening through which the interior of the body portion may be inspected and cleaned out prior to closing, a prefabricated and premachined arcuate nozzle block segment having a plurality of machined substantially tangential nozzles therein welded within said opening to complete said unit, and a radially projecting flange on said one end of the body portion engageable with the exterior face of a selected one of said casing flanges.

10. The invention as defined by claim 9, and an interior wall in said body portion separating said main and auxiliary steam passages, said main passage communicating directly with a group of nozzle openings in said nozzle block segment and said auxiliary passage communicating with at least one endmost nozzle opening in the group.

11. The invention as defined by claim 4, and wherein said valve chest has a pair of spaced axially aligned seats for said hand valve, said hand valve selectively mountable on opposite sides of the valve chest remote from or adjacent to said trip valve element depending upon the selective assemblage of parts to effect either right hand or left hand turbine shaft rotation.

12. A turbine comprising a casing, a turbine wheel and shaft assembly journaled upon said casing, said casing having an exhaust opening and a mounting flange remote from the exhaust opening, a nozzle chest and valve chest unit secured to said flange with the nozzle chest extending removably inside of said casing and the valve chest projecting externally thereof, a governor valve within the valve chest and having a reciprocatory stem projecting outside of the valve chest, a governor head secured to one end of the turbine shaft to turn therewith, a pair of opposed governor weights pivoted to said head, a pair of transversely extending spaced coaxial springs on opposite sides of said weights and engaging the weights to uniformly resist outward swinging movement of the weights by centrifugal force and revolving with the weights and said head, a cable element extending through the bores of said springs, adjustable means on the ends of said cable element engaging the outer ends of the springs to tension the same equally, a governor spindle to revolve with the weights and head and shiftable axially relative to the head and turbine shaft, links pivotally interconnecting said spindle and weights so that the latter may impart axially displacement to the spindle, axial guide means for said governor spindle on said casing, a rotatable and axially shiftable speed changer shaft connected with said guide means and having an external hand wheel, a governor lever pivoted to the speed changer shaft, a control linkage interconnecting said lever and governor valve stem, said speed changer shaft screw-threaded, a screw-threaded element having engagement with the screw-threads of said shaft and shiftable axially of the same upon turning of the speed changer shaft, a first spring engaging said element and urging the same axially in one direction, and a second spring engaging said element and urging it axially in an opposite direction.

13. The invention as defined by claim 12, and where said element is a cup having a screw-threaded nut portion, a bottom wall and a marginal flange, the first-named spring bearing upon the bottom wall outwardly of said nut portion and the second-named spring bearing upon said flange, opposite ends of said springs engaging fixed casing parts.

14. The invention as defined by claim 12, and wherein said governor weights are generally U-shaped in cross section providing inner wall portions which seat the corresponding ends of said coaxial springs, and a guide tube for said cable element fixedly secured to said governor head and through which the cable element may move axially but preventing lateral displacement or whipping of the cable element.

15. The invention as defined by claim 12, and wherein said governor spindle has a bifurcated portion straddling said governor head between said weights with opposite sides thereof connected to said links, a thrust head on the governor spindle and a reduced spindle extension projecting beyond said head, a frictionless bearing receiving said spindle extension, and an axially shiftable support element for said bearing connected with the speed changer shaft.

16. The invention as defined by claim 12, and a casing extension on said turbine casing receiving the governor head and associated elements and a detachable casing part covering said casing extension, speed changer shaft and associated elements.

References Cited in the file of this patent

UNITED STATES PATENTS

| | | |
|---|---|---|
| 790,405 | Stumpf | May 23, 1905 |
| 920,789 | Thomson | May 4, 1909 |
| 1,279,369 | Lang | Sept. 17, 1918 |
| 1,286,204 | Baumann | Dec. 3, 1918 |
| 1,373,289 | Baumann | Mar. 29, 1921 |
| 2,283,126 | Ray | May 12, 1942 |